Figure 5:
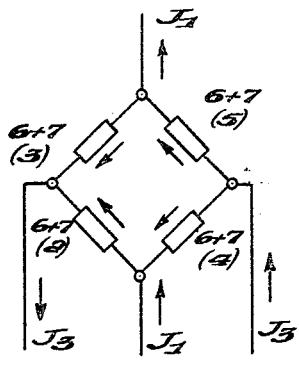

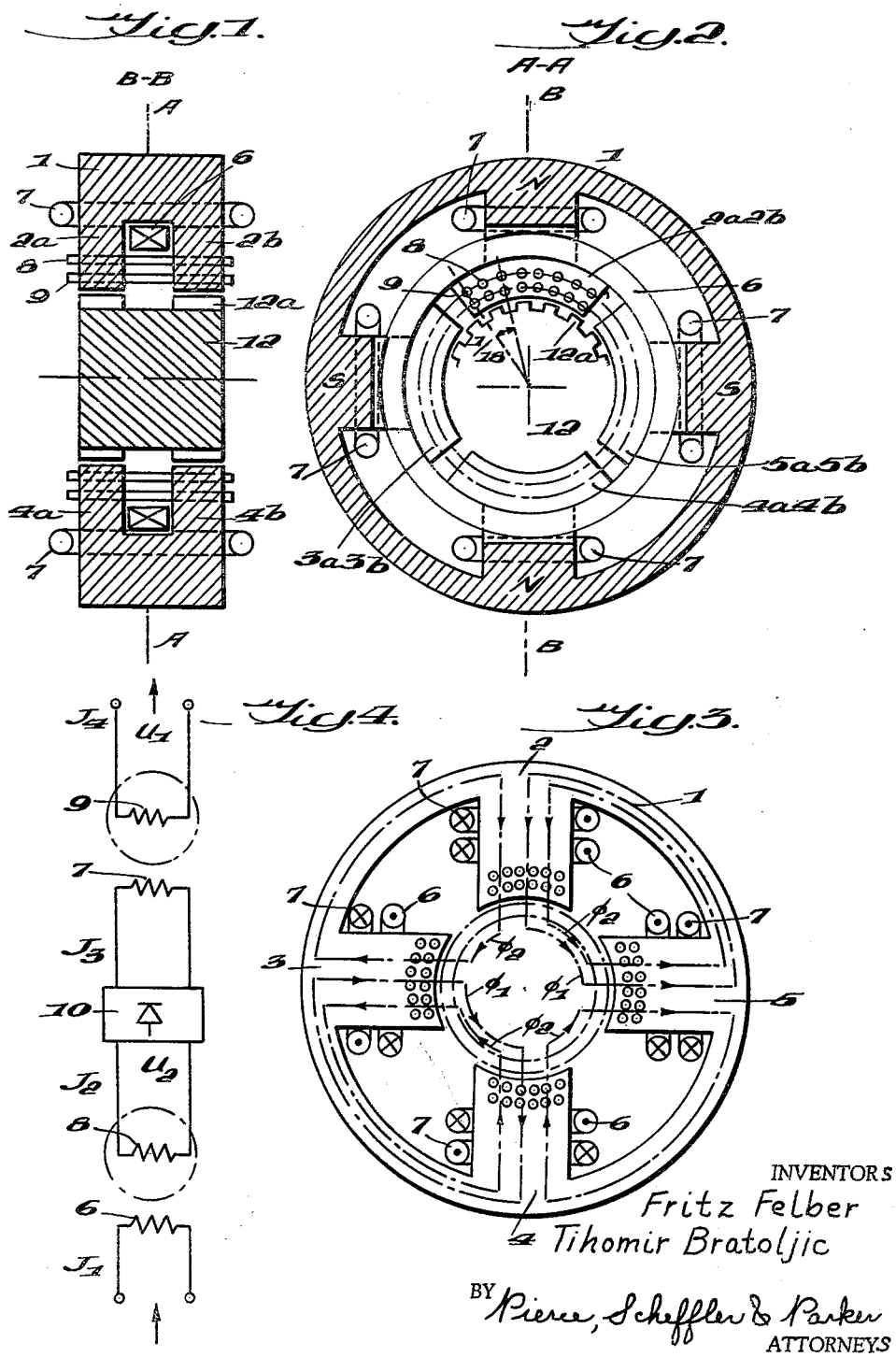

Oct. 1, 1963  F. FELBER ETAL  3,105,943
ALTERNATING CURRENT AMPLIFIER MACHINE
Filed Sept. 19, 1960  2 Sheets-Sheet 2

INVENTORS
Fritz Felber
Tihomir Bratoljic
BY Pierce Scheffler & Parker
ATTORNEYS under the cover of which are arranged magnetic rings one beside the other, which are magnetised in the same sense by the exciter winding 6 lying in the plane of symmetry thus has the poles $2a$—$3a$—$4b$—$5b$ on one side of the exciter winding and the poles $2b$—$3b$—$4b$—$5b$ on the other side of the exciter winding. The excitation system is a two-pole system because the poles on each side are magnetised in the same sense. The second excitation system has, however, four salient poles $2a+2b$, $3a+3b$, $4a+4b$, $5a+5b$. These are magnetised in alternate directions by means of the four exciter coils 7. The first excitation system is a two-pole one as regards the exciter winding 6 and the second excitation system a four-pole one as regards the exciter windings 7. Both systems are magnetically coupled due to the different number of pole pairs.

Located in the poles $2a$—$2b$, $3a$—$3b$, $4a$—$4b$, $5a$—$5b$ of the stator are the working windings 8 and 9. The conductors of the working windings of both systems, which are decoupled with respect to each other, are connected together per pole in such a manner that the conductor groups of one system have an additive voltage effect and the conductor groups of the other a subtractive voltage effect. The windings 8 and 9 are for instance decoupled due to the conductors of the working winding 8 of the first system being displaced in both halves of the machine with respect to the line of symmetry A—A by a pole pitch of the alternating current winding. Moreover the windings are connected in series, so that the voltages resulting from the field of the exciter windings 6 add up, whilst the voltages resulting from the field of the exciter windings 7 compensate each other in the winding 8. The conductors of the working winding 9 of the second system are not displaced in both halves of the machine. The result is that the voltage induced in the working winding 9 by the field of the exciter coil 6 is neutralized externally. The exciter winding 6 has no direct effect on the terminal voltage of the working winding 9. The two exciter windings produce a voltage only in one of both working windings. Working windings 8 and 9 can in this case lie in the same slots.

Both systems can for instance be connected together to form a two-stage amplifier machine, as shown in FIG. 4. The working winding 8 of the first system is connected by way of a rectifier 10 with the exciter winding 7 of the second system. The two machines thus form a two-stage amplifier, where the exciter winding 6 acts as the input winding whilst the working winding 9 forms the output end of the two-stage amplifier machine.

The method of operation is as follows:

As soon as the input winding 6 of the first system is excited by a control current, a voltage occurs in the working winding 8. This does not result in an output voltage in the working winding 9 of the second system. Due to the rectification of the output voltage from winding 8, the exciter winding 7 of the second system which has an alternating pole arrangement, receives an excitation current. A voltage thus occurs at the output end of the working winding 9. No voltage is, however, induced in the working winding 8 of the first system due to the excitation of winding 7. This independence as regards the voltage production in the working windings is due to the different manner in which the two windings are connected.

FIG. 3 shows a further constructional example where there is only one magnet ring. The stator has four poles 2, 3, 4 and 5 on which the exciter windings of both systems are located, whereby one system produces a two-pole excitation and the other system a four-pole excitation of the stator. Mutual freedom of interference between the two systems is achieved by having a different number of pole pairs for each excitation system.

Reference numeral 1 indicates the stator with the poles 2, 3, 4, 5 and 8 is the working winding and 6 the exciter winding of the first stage whilst 9 indicates the working winding and 7 the exciter winding of the second stage of the output power stage. The current passes through the exciter windings 6 in such a manner that for instance poles 2 and 3 are magnetised in the direction towards the armature and poles 4 and 5 in the opposite direction. This causes the resultant field $\phi_1$ of a two-pole machine. The conductors of the working windings 8 of this first stage are in two-pole connection so that an inductive effect is produced in them by this two-pole field $\phi_1$. In the second system the poles are excited alternately. South and north poles follow each other in sequence so that the machine is a four-pole one. The conductors of the working winding 9 associated with this second stage are connected in such a manner that they are induced by the four-pole field $\phi_2$.

The two and four-pole exciter fields exist next to each other without having any mutual effect. Also the working windings 8 and 9 respectively only produce a voltage depending on the corresponding field $\phi_1$ or $\phi_2$. The working windings are therefore mutually decoupled.

The exciter and working windings of both systems are connected together as shown in FIG. 4 to form a two-stage amplifier. Windings 6 form the amplifier input and windings 9 the amplifier output. The combined effect of exciter windings 6 and 7 in FIG. 3 causes the fields in poles 2 and 5 to be strengthened and those in poles 3 and 4 to be weakened. The effects of this asymmetry compensate each other in the working windings 9 of the second stage, for which purpose the two winding parts which are subjected to opposing field changes are connected in series. In the two-pole working winding 8 of the first stage, only this asymmetry produces a resultant voltage. No resultant voltage is induced in this winding by the four-pole fields, because two winding parts are in opposed series connection.

It is possible to combine the exciter windings 6 and 7 so as to form a common winding. The required asymmetry of the magnetic fluxes is achieved by different currents in the individual exciter coils. An advantageous arrangement of the exciter windings is the bridge method of connection shown in FIG. 5. Here, the currents in the coils on poles 3/4 are equal to the difference of $J_1$ and $J_3$, whilst in the coils on poles 2/5 they are equal to the sum of these values. The same effect can also be achieved by means of corresponding shunts connected to the coils.

Figure 6:
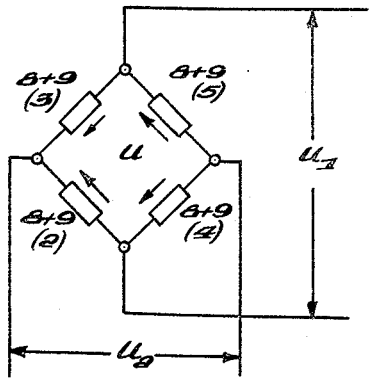

It is also possible to arrange the working windings 8 and 9 in a bridge connection. This arrangement is shown in FIG. 6. The voltages to be obtained from both the systems are indicated by $U_1$ and $U_2$.

Figure 7:
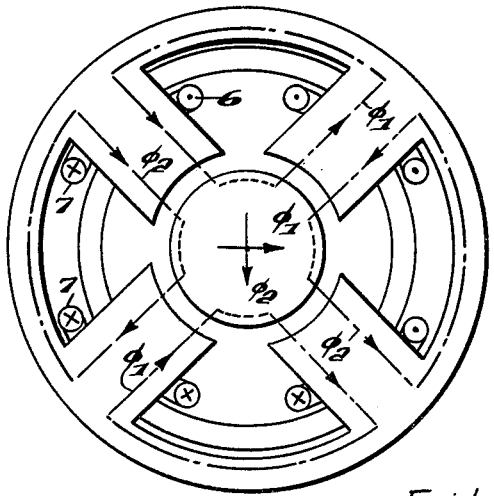

FIG. 7 shows an amplifier machine where the stator has four poles. The exciter windings of both systems consist of part windings each of which encompasses two neighbouring poles. The resultant fields $\phi_1$, $\phi_2$ are then perpendicular to each other.

We claim:

1. In a two-stage alternating current amplifier machine, the combination comprising a magnetic structure having an outer member provided with a plurality of inwardly extending pairs of poles and an inner member confronting said poles and establishing a path for flow of magnetic flux between the inner ends of adjacent poles, a first exciter winding producing a first excitation system in said poles, said first exciter winding serving as the amplifier input, a first working winding linked magnetically to the flux of said first excitation system, said first working winding having a voltage induced therein by variation in the flux in said first excitation system only, a second exciter winding producing a second excitation system in said poles, said second exciter winding being connected with said first working winding which constitutes the output of the first amplifier stage to receiver exciter current, a second working winding linked magnetically only to the flux of second excitation system, said second working winding serving as the output of the second amplifier stage and having a voltage induced therein by variation only in the flux in said second excitation system, the magnetic fluxes being linked with their respective working windings continuously in the same sense.

2. A two-stage alternating current amplifier machine as defined in claim 1 wherein said first and second exciter windings and said first and second working windings are located on said outer member and the surface of said inner member confronting the inner ends of the poles of said outer member is toothed.

3. A two-stage alternating current amplifier machine as defined in claim 1 wherein the number of pole pairs forming part of said first excitation system differs from the number of pole pairs forming part of second excitation system.

4. A two-stage alternating current amplifier machine as defined in claim 1 wherein said outer member of said magnetic structure includes at least four poles, one of said excitation systems producing a two-pole excitation of said outer member and the other excitation system producing a four-pole excitation of said outer member.

5. A two-stage alternating current amplifier machine as defined in claim 1 wherein said first and second excitation systems are constituted by the same number of pole pairs and wherein their respective excitation fluxes are mutually displaced along the periphery by half an exciter pitch.

6. A two-stage alternating current amplifier machine as defined in claim 5 wherein said outer member of said magnetic structure is provided with at least four poles on which parts of said first and second exciter windings are arranged such that each part encompasses two neighboring poles.

7. A two-stage alternating current amplifier machine as defined in claim 1 and which further includes means interconnecting said first and second exciter windings through an electrical bridge.

8. A two-stage alternating current amplifier machine as defined in claim 1 and which further includes means interconnecting said first and second working windings through an electrical bridge.

References Cited in the file of this patent

UNITED STATES PATENTS

| 2,608,623 | Cutler et al. | Aug. 26, 1952 |
| 2,710,941 | Bonnell | June 14, 1955 |

FOREIGN PATENTS

| 1,002,459 | France | Oct. 31, 1951 |